Dec. 5, 1961     D. M. BEST     3,011,556
CASING SCRAPER
Filed Sept. 20, 1957     2 Sheets-Sheet 2
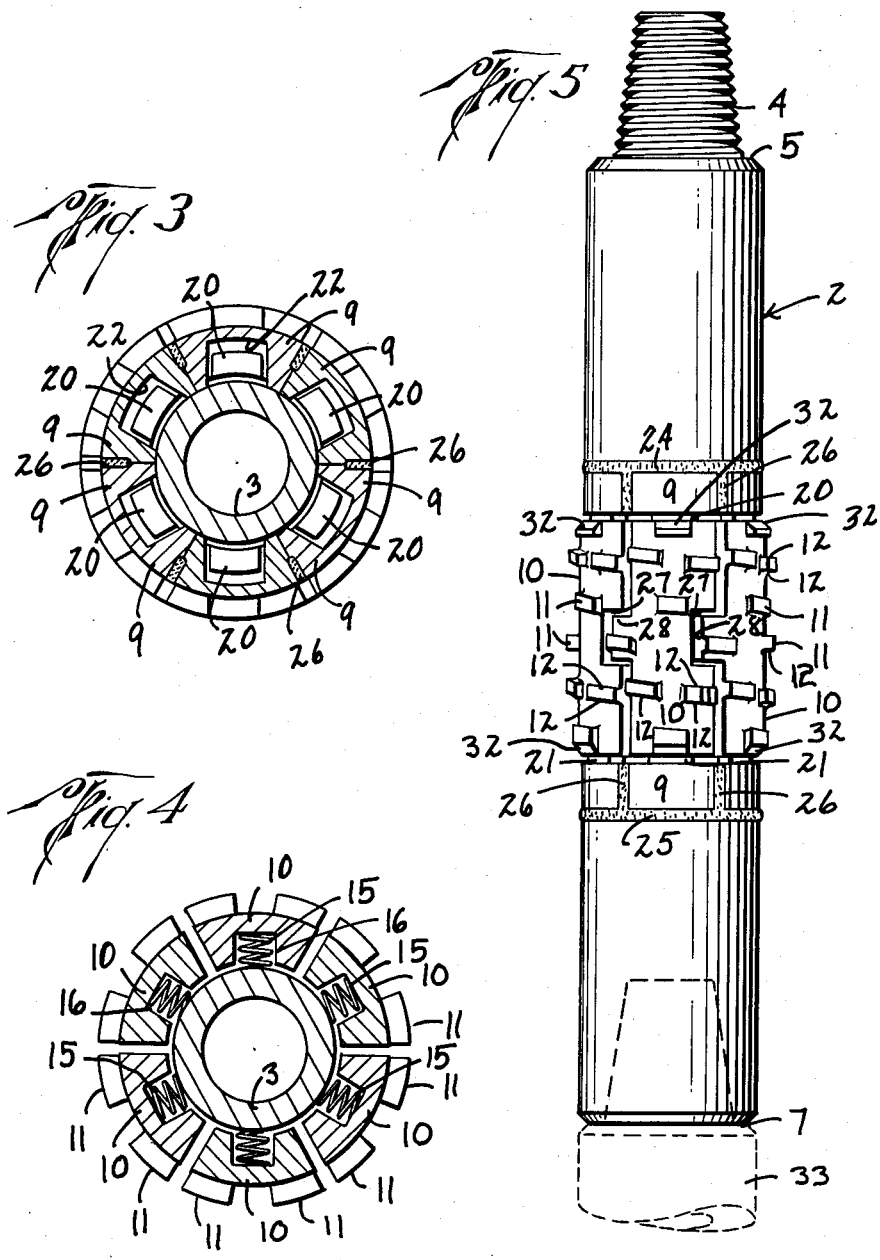
David M. Best
INVENTOR.
BY
ATTORNEYS United States Patent Office 3,011,556
Patented Dec. 5, 1961

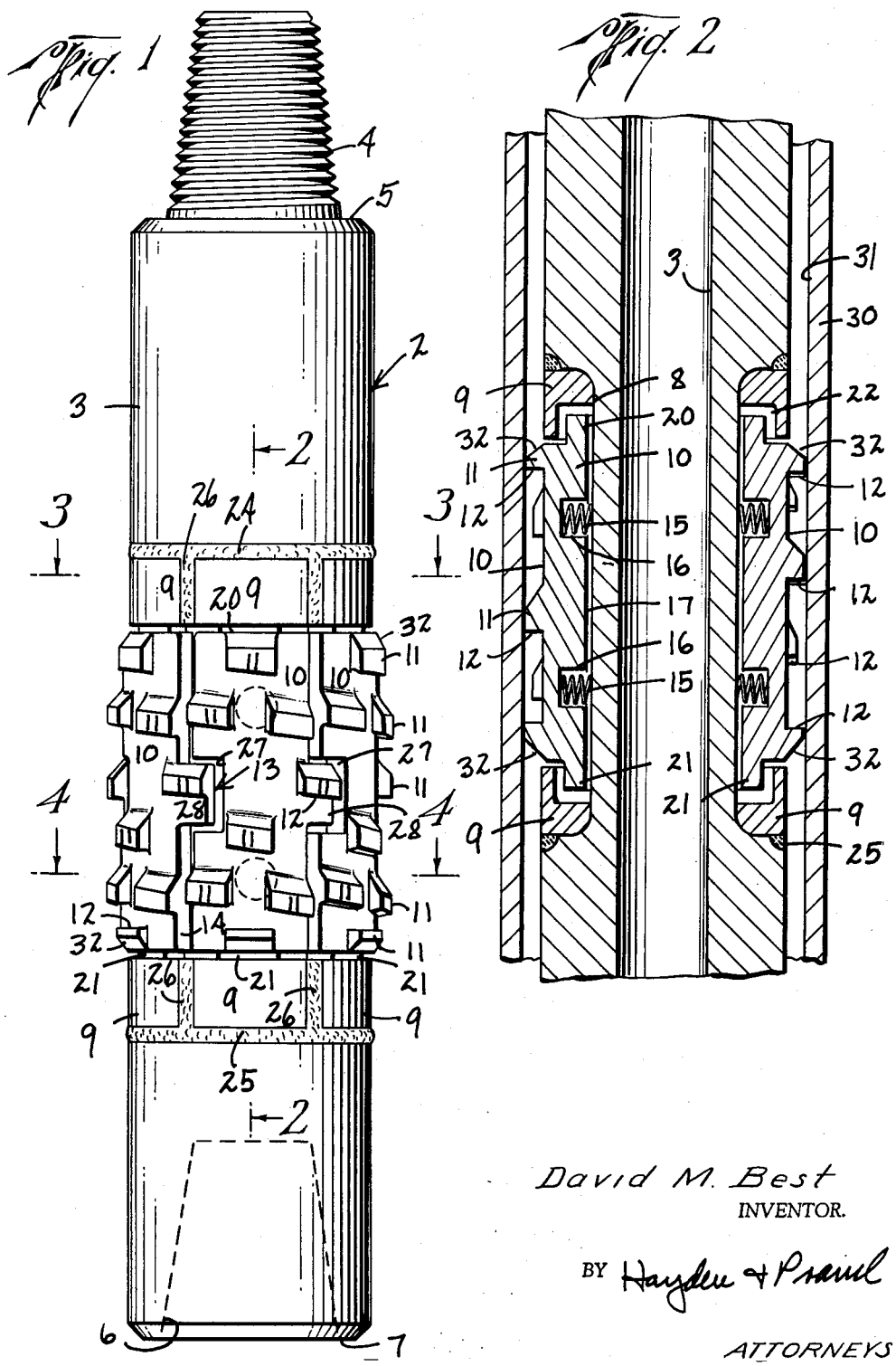

3,011,556
CASING SCRAPER
David M. Best, 6423 Foster St., Houston, Tex.
Filed Sept. 20, 1957, Ser. No. 685,107
4 Claims. (Cl. 166—173)

The present invention relates to a scraper for tubular members and more particularly to a device which may be moved through well pipe in situ in the earth for scraping the inner periphery thereof. Various forms of scrapers are in use at the present time for scraping tubular members such as well pipe. Such devices are generally referred to as casing scrapers because their primary use is for scraping the casing pipe of a well bore so as to remove paraffin, burrs, any cement sheaths, or other surface irregularities from the inner periphery of the casing.

The devices presently in use for accomplishing this function are very long and cumbersome because the scraping surfaces thereon must be overlapped about the entire circumference so that a full 360° coverage is provided on the tool to insure complete contact of the scraping tool with the inner periphery or wall of the casing pipe through which it is moved. Heretofore, in order to accomplish such function, the tools have been unusually long and the protruding pipe scraping surfaces are positioned on the body throughout its length in staggered relationship to insure complete contact of the scraping surfaces with the inner periphery of the casing being scraped.

Also, all of such devices which are presently in use are assembled with various component parts such as rings, screws, clips, wires, etc. for aiding in retaining the scraper tool in assembled relationship. Quite often, the tools of the prior art come "unwound" in the well bore so that the tool or parts thereof become disassembled and are lost in the well bore thereby necessitating a fishing operation to remove them from the well.

The very construction and nature of the tools presently on the market for accomplishing the function of scraping casing pipe is complicated and cumbersome and quite costly to manufacture, as well as to service. Also, the arrangement of the cutter blades or surfaces on the body unnecessarily lengthens the tool, thereby making it difficult to manipulate.

The present invention overcomes the above and other objections to casing scrapers presently in use in that it provides a tool of relatively simple construction, wherein the blades are arranged in a circumferential or circular row about the body, but which is efficient and positive in its scraping operation.

Another object of the present invention is to provide a casing scraper including a body and a plurality of radially moving segments or elements carried by said body in a circular row, there being spring means for urging said segments radially outward of said body, and said segments being interlapped and provided with a plurality of protruding surfaces in staggered circumferential relationship so as to engage the pipe being scraped about its entire inner periphery.

Still a further object of the present invention is to provide a casing scraper wherein a plurality of scraping elements are carried by the body in a manner so that the length of the body can be materially reduced as compared with the length of casing scrapers presently in use.

Still a further object of the present invention is to provide a casing scraper including a body with a plurality of scraping elements positioned thereon in a circular row, said elements being interlapped and provided with scraping surfaces thereon in circumferentially overlapping relationship so as to engage the inner periphery of the pipe through which the casing scraper is moved, and means for accommodating relative outward radial movement of said segments or sections relative to the body, while maintaining such sections in a substantially non-rotational and non-longitudinal position on said body so that as the device is moved through casing, the inner periphery of the casing is engaged by the scraper surfaces to eliminate burrs and other projections on the inner periphery of the casing.

Other objects and advantages of the present invention will be apparent from a consideration of the following description and drawings, wherein:

FIG. 1 is a side elevation of the preferred embodiment of the scraper of the present invention;

FIG. 2 is a partial sectional view showing the scraper of FIG. 1 in a tubular member and the structural details and relationship of the elements or segments mounted on the scraper body;

FIG. 3 is a sectional view on the line 3—3 of FIG. 1 and shows the hold-down means secured or mounted on the body which means are provided for retaining the segments or elements in position on the body;

FIG. 4 is a sectional view on the line 4—4 of FIG. 1 and shows the spring means which are provided for urging the elements or segments radially outward relative to the body upon which they are mounted; and FIG. 5 is an alternate form of the invention illustrated in FIG. 1 of the invention and is substantially the same as that shown in FIG. 1 with the exception that the cutting surfaces on the segments or elements are adapted to cut when the form of the invention shown in FIG. 5 is moved in either direction in the tubular member or well pipe.

In FIG. 1 the invention is referred to generally by the numeral 2 and is shown as including the body 3 which is of a suitable size for being received within the tubular member which is to be scraped and may be provided with a bore to accommodate fluid flow therethrough. The body 3 is provided with a threaded connection 4 at one end 5 and a threaded connection 6 at the other end 7 whereby the invention 2 may be secured within a well string or other suitable means for lowering into the well bore to perform the scraping operation on the casing therein.

It will be noted that the body 3 is provided with an annular recess 8 which is spaced from each of the ends 5 and 7 of the body 3, and the annular recess 8 is of a suitable depth to receive the hold-down members 9 and segments or scraping elements 10 therein as shown in FIGS. 1 and 5 of the drawings.

It will be noted that the segments or scraping elements 10 are circumferentially arranged on the body 3 within the recess 8 in a circular row. Additionally, each segment or element 10 is provided with a plurality of protruding surfaces 11 arranged thereon in a circumferentially staggered relationship and are laterally extending, as well as being laterally and longitudinally spaced so that the cutting or scraping surfaces 12 on each of the protruding portions or surfaces 11 overlaps the adjacent cutting surfaces 12 of the adjacent members 11 of each of the segments or elements 10.

Also, the segments or elements 10 are arranged in an interlapped relationship relative to each other as shown generally at 13 so that the protruding scraping surface elements 11 overlap the space 14 between adjacent segments 10. This insures complete contact of the scraping or cutting surfaces 12 of the portions 11 with the inner periphery of the pipe being scraped.

In order to urge the segments 10 radially outward relative to the body 3 upon which they are carried, suitable spring means as illustrated at 15 may be provided which are adapted to fit within the recesses 16 on the back side 17 of each of the segments 10. The springs 15 urge each of the segments outwardly so as to force the scraping surfaces 11 of the elements 10 into abutting relationship with the periphery of the member through which the device is being moved in order to effect scraping and cleaning thereof.

It is desirable to maintain the segments or elements 10 in a predetermined longitudinal and non-rotational relationship relative to the body 3 upon which they are carried, and to this end lugs 20 and 21 at each end of the segments 10 may be provided, which lugs are adapted to fit with the mating recesses 22 in each of the hold-down members 9. It will be noted, as illustrated more clearly in FIGS. 2 and 3, that the depths of the recess 22 in hold-down member 9 is greater than the width of the lugs 20 and 21 at each end of the elements 10 so that radial movement between the sections 10 and the body 3 may be accommodated, while maintaining the elements 10 in a substantially non-rotational position relative to the body 3 as well as maintaining the elements or segments 10 in a substantially non-longitudinal movable relationship relative to the body 3. The lugs 20 act as a retaining means for the elements 10, and also act as a drive to rotate the members 10 as the body 3 is rotated.

As shown in the present invention, the hold-down members 9 may be secured to the body 3 by any suitable means such as welding, and in assembling the device of the present invention the springs 15 may first be positioned within the recesses 16 of one of the segments 10, and a hold-down member 9 positioned over the lug on one end of the element 10. Thereupon, a weld as shown at 24 can be placed on the tool 2 so as to position the hold-down member 9 on the body 3. Thereafter, the hold-down member 9 at the bottom of the segment or element 10 can be welded as indicated at 25 so as to thereby position the segment or element 10 within the recess 8 on the body 3. This operation can be repeated until all of the segments 10 have been positioned within the recess and all of the hold-down members 9 have been welded in position on the body 3 and a weld as illustrated at 26 placed between adjacent hold-down members 9 to securely retain them on the body 3.

As previously mentioned, the hold-down members 9, by reason of the recesses 22 therein and the interfitting relationship of such recesses with the lugs 20 and 21 on each of the segments 10, permit radial movement of the sections 10, whereby the lugs may move outwardly relative to the body 3 to expand against the inner periphery of the member through which the scraping device is being moved. The movement of each of the segments is independent of any movement of any of the other segments.

Attention is specifically directed to the interlapping relationship herein above referred to by the numeral 13, and it will be noted that this relationship may be effected by providing a recess as shown at 27 in each of the segments with a lug 28 extending from an adjacent segment 10 to fit within the recess 27. The exact structural arrangement and number of recesses 27 in the segments 10, as well as the structural arrangement and number of the interfitting lugs 28 may be varied without departing from the scope of the invention; the single recess 27 is shown for illustrative purposes as being on the side of the segment substantially mid-way between the ends thereof.

As shown in FIG. 1, the invention is designed so as to scrape as it is lowered downwardly through the casing pipe in the well bore, and while it is believed that the operation of the invention will be apparent by reason of the foregoing description, to further amplify, it will be assumed that the invention as illustrated at 2 has been positioned in a well string and is being lowered through a well pipe as shown at 30 in FIG. 2. It should be obvious that any irregularities on the inner periphery 31 of the well pipe 30 will be engaged by the cutting surface or scraping surface 12 of each of the protruding or raised portions 11 on the segments 10. Since the portions 10 are in overlapping relationship, and since the segments 10 are arranged in a circular row upon the body 3, the entire inner periphery 31 of the pipe 30 will be engaged by the cutting surfaces 12 throughout the 360° circumferential length or dimension of the periphery 31 of the pipe 30. The raised portions 11 adjacent the end of each of the segments 10 may be tapered as illustrated at 32 so as the device moves through a coupling within the pipe, it will move through the coupling without hanging up therein. Of course, since the height of the raised portions 11 is the same or at least substantially equal to the height of the remainder of the raised portions on each of the segments 10, then after the coupling shoulder or recess has been engaged by the tapered portion 32 and after the segments have been radially moved by such contact, they will move through the coupling with a minimum of effort.

The device is lowered through the pipe 30 until the scraping operation has been completed. If desired, it may be raised to the surface and such operation repeated again. In some situations the tool may be connected in a drill string to scrape the casing while drilling out plugs or performing other operations in the well. The protruding surfaces 12 are in staggered relation so that even though the well pipe is contacted about its entire periphery in a circular row by such surfaces, fluid flow may occur around the protruding staggered surfaces so that the tool can be lowered into a well bore, having fluid therein, without difficulty. Also, fluid flow may occur in the space 14 between the circumferentially arranged segments.

In FIG. 5 a form of the invention is shown wherein a cutting surface 12 is provided on each side of each of the raised protruding portions 11 so that the device can be used to scrape not only as it is lowered into the well bore, but as it is removed therefrom. A portion of a bit is illustrated at 33 in dotted line and is shown as secured to the lower end of the tool to show the relationship of the device to the bit when it is secured in a drilling string.

The construction of the form of the invention shown in FIG. 5 is identical with that previously described with regard to FIG. 1, with the exception of the modification of the surfaces 11 and 12 as above mentioned.

Particular attention is directed to the construction of the scraper of the present invention in that the elements 10 are arranged in a circular row on the body 3 spaced from each end 5 and 7 thereof. By this construction, the necessity of providing a body 3 of unusual length so as to accommodate sufficient staggered cutting surfaces to cut over the entire 360° surface of the periphery against which the scraper may be moved is thereby eliminated. The present invention provides a scraper wherein the full 360° of the pipe being scraped is contacted, while on the other hand eliminating the necessity of providing a body of unusual and undesirable and unwieldy lengths. Also, while the hold-down members 9 have been shown as being welded to the body 3, in some circumstances it may be desirable to mount them or retain them on the body 3 by any other suitable means such as screws or the like.

The present invention provides a relatively economical scraping tool which overcomes the objections of prior art devices, in that it eliminates the necessity of providing a body of unusual length so as to accommodate sufficient scraping surfaces thereon to cover the entire 360° of the tubular member being scraped.

It seems obvious that modifications hereof may be made without departing from the scope of the invention.

Broadly the present invention relates to a scraper tool and more particularly to a scraper tool which can be economically built with a minimum of effort and eliminates many of the working parts of prior art devices.

What is claimed is:

1. A casing scraper including a body, a threaded connection for securing said body in a string of pipe whereby the scraper may be run in casing, said body being reduced in diameter to form an annular recess extending about said body, a plurality of scraper elements in said recess, means to interlap said elements circumferentially about said body, said means including a lug on one side of one scraper element fitting in a recess on the adjacent side of an opposite element, spring means mounted on said body for urging said elements radially outward thereof, a hold-down member for each of said elements positioned at each end of said body recess, lug means at each end of said elements and a slot in each of said hold-down members for receiving said lug means whereby said elements are retained on said body by said hold-down members, means for securing said hold-down members on said body, and a plurality of raised scraper surfaces on each of said elements, said surfaces being arranged on each of said elements in overlaping, spaced relationship, a raised scraper surface on said lug overlapping said scraper surfaces on the adjacent element so that said raised scraper surfaces on said elements engage the casing about its entire surface to effect scraping thereof.

2. A casing scraper wherein the scraping elements are arranged circumferentially on the scraper including a body, said body being reduced in diameter to form an annular recess in the outer periphery of said body and spaced from each end thereof, a plurality of scraping elements in said recess, means retaining said elements in said recess, spring means between said body and said elements urging said elements radially outwardly of said body, a plurality of laterally extending, longitudinally spaced protruding scraper surfaces on each element with the scraper surfaces on each element being longitudinally staggered, means to interlap said elements circumferentially about said body, said means including a lug on one side of one scraper element fitting in a recess on the adjacent side of an opposite element, and a raised scraper surface on said lug overlapping the space between said elements whereby the casing scraper contacts the full 360° inside surface of a casing through which it is moved to effect scraping thereof.

3. A casing scraper wherein the scraping elements on the body of the scraper are arranged in a circular row about the scraper body so that the overall length of the scraper can thereby be reduced without sacrificing efficiency, the scraper including a body, said body having a reduced diameter to form an annular recess therein spaced from each end of said body, a plurality of scraping elements within said recess, spring means between said body and said elements urging each of said elements radially outward relative to said body, means mounted on said body for retaining each of said elements against rotational and longitudinal movement and accommodating limited radial movement of said elements, means to interlap said elements circumferentially about said body, said means including a lug on one side of one scraper element fitting in a recess on the adjacent side of an opposite element, and a plurality of protruding scraping surfaces on each of said elements with the scraping surfaces on each element being overlapped circumferentially and a scraping surface on said lug to overlap the adjacent element circumferentially to provide a full 360° of said scraping elements on said body.

4. The combination recited in claim 3 wherein said retaining means mounted on said body includes a recess therein and wherein said elements include lug means on each end thereof for fitting within said recess whereby said elements are thereby retained on said body.

References Cited in the file of this patent

UNITED STATES PATENTS

| | | |
|---|---|---|
| 96,552 | Coyle | Nov. 9, 1869 |
| 168,072 | Williams | Sept. 21, 1875 |
| 1,575,267 | Houldsworth | Mar. 2, 1926 |
| 2,275,939 | Baker | Mar. 10, 1942 |
| 2,464,390 | Hammer | Mar. 15, 1949 |
| 2,667,931 | Baker | Feb. 2, 1954 |
| 2,713,913 | Ragan | July 26, 1955 |
| 2,743,780 | Brown | May 1, 1956 |